UNITED STATES PATENT OFFICE.

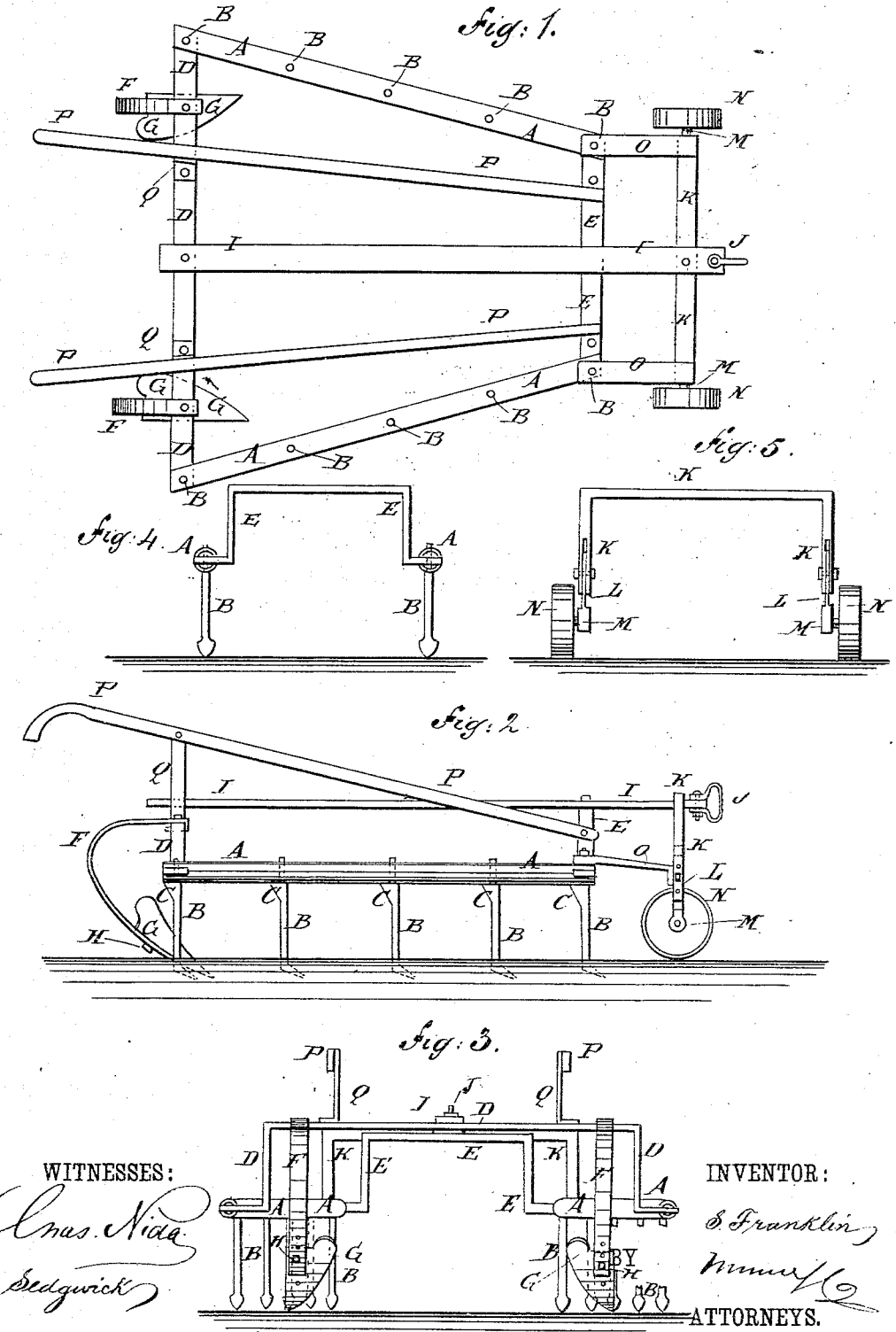

SOLOMON FRANKLIN, OF PINE BLUFF, ARKANSAS.

COMBINED HARROW, CULTIVATOR, AND PLOW.

SPECIFICATION forming part of Letters Patent No. 325,598, dated September 1, 1885.

Application filed July 24, 1884. (No model.)

*To all whom it may concern:*

Be it known that I, SOLOMON FRANKLIN, of Pine Bluff, in the county of Jefferson and State of Arkansas, have invented certain new and useful Improvements in Combined Harrows, Cultivators, and Plows, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a side elevation of the same. Fig. 3 is a rear elevation of the same. Fig. 4 is an elevation of the front cross-bar, showing the ends of the side bars and the forward cultivator-teeth. Fig. 5 is an elevation of the axle and gage-wheels.

The object of this invention is to provide an implement constructed in such a manner that it can be readily adjusted for use in the various operations necessary in the cultivation of plants planted in rows or drills.

The invention consists in a combined harrow, cultivator, and plow constructed with inclined tubular side bars provided with cultivator-teeth and connected by arched cross-bars of unequal length, to the rear one of which are attached curved standards provided with adjustable plows, and to the forward one and to the draw-bar are attached an adjustable bent bar and its braces carrying the gage-wheels, whereby the soil can be pulverized and thrown toward or from the plants and the depth to which the teeth and plows enter the ground can be regulated, as will be hereinafter fully described.

A are the side bars of the machine, which are made of gas-pipe or other suitable tubing, and are perforated to receive the shanks of the cultivator or harrow teeth B. The perforations in the upper sides of the bars A are round, and the perforations in the lower sides are square to receive the correspondingly-shaped shanks of the teeth B and hold the said teeth from turning. The harrow-teeth B have shoulders C upon the rear sides of their upper parts, to rest against the lower sides of the bars A and strengthen the said teeth against the draft-strain. The teeth B are secured in place by nuts screwed upon the upper ends of their shanks.

The ends of the side bars, A, are slotted to receive the ends of the cross-bars D E, which are secured in place by the shanks of the rear and forward cultivator-teeth, B. The cross-bars D E are each bent four times at right angles, or have their middle parts raised or arched, so that the machine can pass over tall plants without injuring them. The forward cross-bar, E, is made shorter than the rear cross-bar, D, so that the forward ends of the side bars, A, will incline toward each other, and several holes are formed in the end parts of the said forward cross-bar, E, so that a greater or less inclination can be given to the said side bars, as may be desired, to cause the teeth B to pulverize the soil less or more finely.

F are the plow-standards, the upper ends of which are bent into U form to pass around the bar D, and are secured to the said bar by bolts. The standards F are curved rearward, downward, and forward to bring their lower parts into proper position to receive the plows G, and have several holes formed in their said lower parts to receive the bolts H, that fasten the said plows to them, so that the said plows can be adjusted to work deeper or shallower in the ground, and can be exchanged to throw the soil toward or from the plants, as may be desired.

I is the draw-bar, the rear end of which is bolted to the center of the rear cross-bar, D, and to its forward end is attached a clevis, J, to which a double-tree is to be attached to receive the draft. The draw-bar I, near its forward end, is bolted to the center of the bar K, the ends of which are bent downward and are slotted vertically to receive the bars L. To the lower ends of the bars L are attached the journals M of the gage-wheels N. Several holes are formed in the bars K L to receive the fastening-bolts, so that the said gage-wheels can be adjusted higher or lower to regulate the depth to which the teeth B and plows G enter the ground. The bar K is strengthened in position by the brace-bars O, the forward ends of which are bolted to the arms of the said bar K, and their rear ends are bolted to the ends of the side bars, A, and the cross-bar E.

P are the handles, the forward ends of which are bolted to the upright parts of the forward cross-bar, E, and their rear parts are bolted to the upper ends of the uprights Q. The uprights Q are made of such a length as to raise the handles to a suitable height, and their lower ends are bolted to the rear cross-bar, D.

I am aware of the employment, broadly, of inclined side bars and of a central draft bar or lever with the tongue suspended therefrom, of toothed beams connected together by arched bars or yokes, of a rear cross-beam having teeth or shoes connected to its downwardly-extended ends, and of means for regulating the depth of plowing.

Having thus described my invention, I claim as new and desire to secure by Letters Patent—

1. A combined harrow, cultivator, and plow constructed substantially as herein shown and described, and consisting of the inclined tubular side bars, A, the cultivator-teeth B, the arched cross-bars D E, of unequal length, the bent standards F and their plows, the draw-bar I, and the gage-wheels N and their adjustable support, said standards F having their upper ends secured to the rear cross-bar, D, and said bar I having its forward end connected to the upper portion of the bar K of the gage-wheel N, as set forth.

2. In a combined harrow, cultivator, and plow, the combination, with the side bars, A, and the arched cross-bars D E, of the draw-bar I, the adjustable U-bar K L, the gage-wheels N, and the braces O, substantially as herein shown and described, whereby the depth to which the teeth and plows enter the ground can be regulated, as set forth.

SOLOMON FRANKLIN.

Witnesses:
 Jos. W. BOCAGE,
 E. W. BOCAGE.